United States Patent [19]
Kruger et al.

[11] Patent Number: 5,765,450
[45] Date of Patent: Jun. 16, 1998

[54] BICYCLE PEDAL

[76] Inventors: Andre L. Kruger, 28 Herman Street, Beaufort West, Cape Province; Roderick M. Dyson, 48 Mead Way, Kelvin, Sandton, Transvaal Province, both of South Africa

[21] Appl. No.: 816,299

[22] Filed: Mar. 13, 1997

Related U.S. Application Data

[62] Division of Ser. No. 348,723, Dec. 2, 1994, abandoned.

[30] Foreign Application Priority Data

Oct. 21, 1994 [ZA] South Africa .................. 94/8291

[51] Int. Cl.$^6$ .................................................. G05G 1/14
[52] U.S. Cl. ................................... 74/594.6; 74/594.4
[58] Field of Search ............................. 74/594.4–594.6; 36/131

[56] References Cited

U.S. PATENT DOCUMENTS

| | | |
|---|---|---|
| 4,686,867 | 8/1987 | Bernard et al. . |
| 4,932,287 | 6/1990 | Ramos . |
| 4,947,708 | 8/1990 | Lacombe . |
| 5,003,841 | 4/1991 | Nagano . |
| 5,079,968 | 1/1992 | Starner . |
| 5,115,692 | 5/1992 | Nagano . |
| 5,125,173 | 6/1992 | Nagano et al. . |
| 5,203,229 | 4/1993 | Chen . |
| 5,259,270 | 11/1993 | Lin . |
| 5,417,128 | 5/1995 | Beyl . |
| 5,419,218 | 5/1995 | Romano . |
| 5,423,233 | 6/1995 | Peyre et al. . |
| 5,497,680 | 3/1996 | Nagano . |

FOREIGN PATENT DOCUMENTS

| | | | |
|---|---|---|---|
| 0 098 329 A1 | 1/1984 | European Pat. Off. . | |
| 0 466 075 A1 | 1/1992 | European Pat. Off. . | |
| 0 485 956 A1 | 5/1992 | European Pat. Off. . | |
| 0 516 013 | 12/1992 | European Pat. Off. . | |
| 0 553 934 A1 | 8/1993 | European Pat. Off. . | |
| 2623464 | 5/1989 | France | 74/594.6 |
| 25968 | of 1905 | United Kingdom | 74/594.6 |

*Primary Examiner*—Vinh T. Luong
*Attorney, Agent, or Firm*—Marshall, O'Toole, Gerstein, Murray & Borun

[57] ABSTRACT

A bicycle pedal which is releaseably securable to an engagement member provided on the lower surface of a cyclist's shoe comprises a foot support rotatably mounted on a spindle, the foot support having first and second support members which are pivotable relative to each other about a spindle axis. There is a further cleat engaging part provided at the free opposite ends of each support member, and a member for biasing the support members towards a substantially co-planar position.

2 Claims, 7 Drawing Sheets

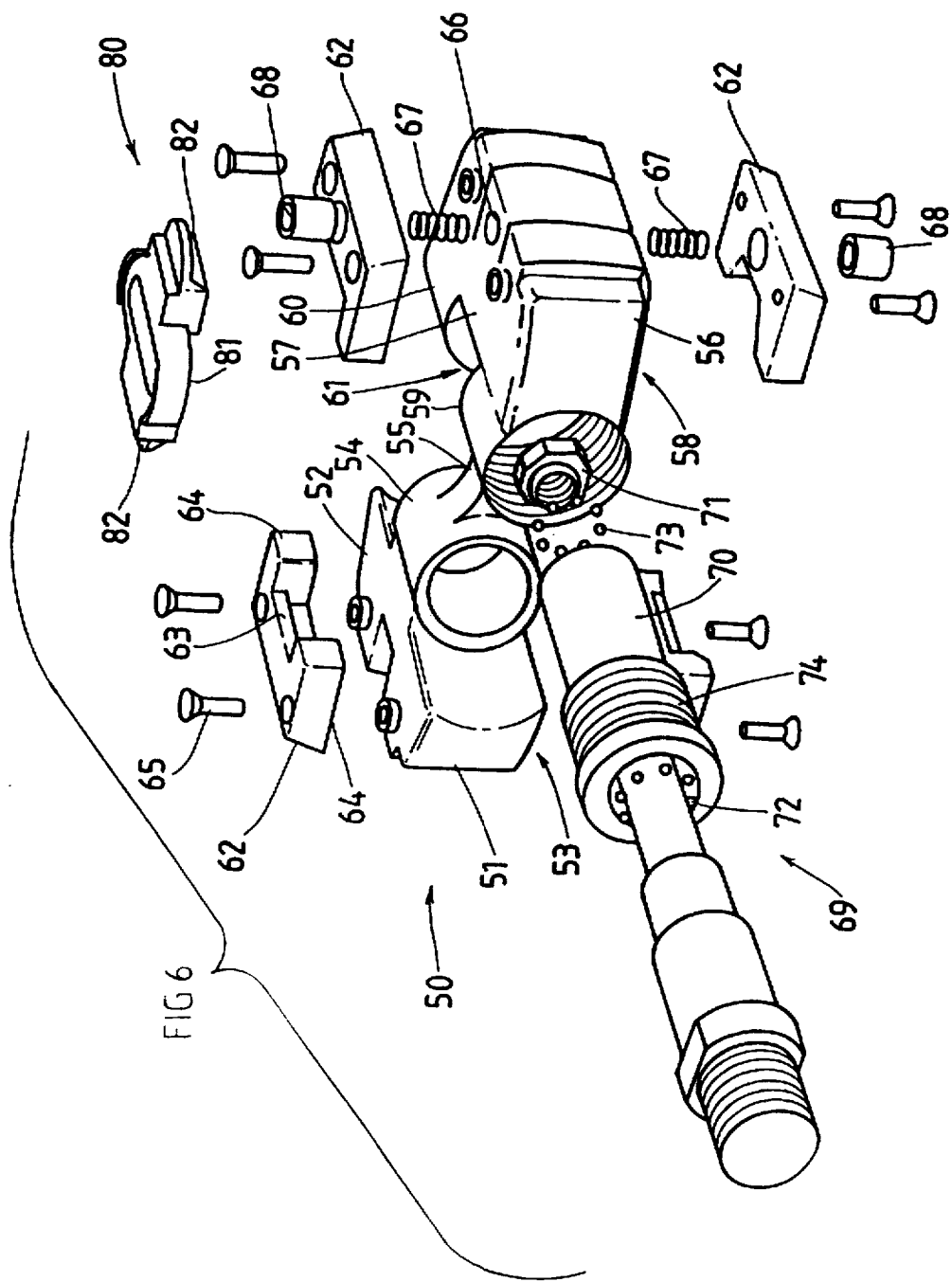

BICYCLE PEDAL

This is a Divisional of U.S. application Ser. No. 08/348, 723, filed Dec. 2, 1994 now abandoned.

FIELD OF THE INVENTION

THIS INVENTION relates to a bicycle pedal and more particularly to a bicycle pedal which is releasably securable to an engagement member provided on the lower surface of a cyclist's shoe.

BACKGROUND TO THE INVENTION

Various bicycle pedal arrangements exist which allow the pedal to be releasably securable to an engagement member provided on the lower surface of a cyclist's shoe. The engagement member is commonly referred to as a cleat.

Bicycle pedal arrangements of the type referred to normally have a pedal body which is rotatably mounted on a spindle. The pedal body has a front engaging device and a rear engaging device. The cleat has front and rear lips which releasably engage with the respective front and rear engaging devices.

Normally the rear engaging device is biased by a spring towards a locked position. The cleat is engaged with the pedal body by firstly engaging the front lip of the cleat with the front engaging device. The rear engaging device is then forced away from the locked position against a spring bias by the rear lip of the cleat until the cleat is located in a position in which the engaging device can return to its normal position to lock around the cleat.

It will be appreciated that a relative soft bias of the rear engaging device towards the locked position will enable easy engagement of the rear lip of the cleat with the rear engaging device. However the bias of the rear engaging device towards the locked position must be sufficient to prevent unintentional release of the rear lip during cycling. The result is that the bias of the rear engaging device has to be of a magnitude which does not always allow for easy engagement of the rear lip with the rear engaging device.

It is further desirable that the cyclist's shoe must be rotatable, at least to a certain extent, around an axis extending from the plane of the pedal body. The cyclist's shoe further has to be disengaged from the pedal body when rotated beyond a predetermined point. This feature is particularly important to allow automatic release of the shoe during a fall.

OBJECT OF THE INVENTION

It is an object of this invention to provide a bicycle pedal which is releasably secured to an engagement member provided on the lower surface of a cyclist's shoe where the engagement member is relatively easily engageable with the pedal, where disengagement between the engagement member and pedal is not possible during normal cycling and where the engagement member will disengage from the pedal on rotation beyond a predetermined point of the engagement member around an axis extending from the plane of the bicycle pedal.

SUMMARY OF THE INVENTION

According to this invention, there is provided a bicycle pedal comprising a foot support rotatably mounted on a spindle, the foot support having first and second support members which are pivotable relative to each other about the spindle axis, cleat engaging means provided at the free opposite ends of each support member, and means for biasing the support members towards a substantially co-planar position.

Further features of this invention provide for contiguous ends of the support members to be pivotally connected to each other, for the biasing means to be a coil spring mounted around the spindle arranged to force cleat support surfaces of the first and second members towards each other and for there to be a stop member to prevent the cleat support surfaces approaching each other at an acute angle.

Still further features of this invention provide for the first support member to provide a front cleat support surface and for the second support member to provide a rear cleat support surface and, for the cleat engaging means to be lip formations at the free ends of the support members.

A further feature of this invention provides a cleat having a base and locking formations on opposed ends of the base, the locking formations being shaped to, in use, co-operate with the cleat engaging means provided at each end of the support members.

Still further the invention provides for the lip formation on the second support member to be shaped to allow, in use, release of the shoe cleat by movement of the shoe cleat towards the operatively outer side of the pedal.

Alternatively the locking formation on the operatively rear end of the shoe cleat is shaped to allow, in use, release of the shoe cleat by movement of the shoe cleat towards the operatively outer side of the pedal.

The invention further extends to a bicycle pedal comprising a foot support rotatably mounted on a spindle, the foot support having first and second support members, one at each end of the foot support, first and second support surfaces on each support member, the support members being pivotable relative to each other about the spindle axis, cleat engaging means provided at the free opposite ends of each support surface, and biasing means for biasing the co-operating first and second support surfaces towards a substantially co-planar position.

A further feature of the invention provides for one support member to carry an arm projecting into a recess in the other support member and located between springs positioned between the arm and the other support member.

These and other features of the invention are described in more detail below.

BRIEF DESCRIPTION OF THE DRAWINGS

Preferred embodiments of the invention are described below, by way of example only, and with reference to the accompanying drawings in which;

FIG. 6 is an exploded view of an alternative embodiment of a bicycle pedal;

DETAILED DESCRIPTION OF THE INVENTION WITH REFERENCE TO THE DRAWINGS

Figure 1:
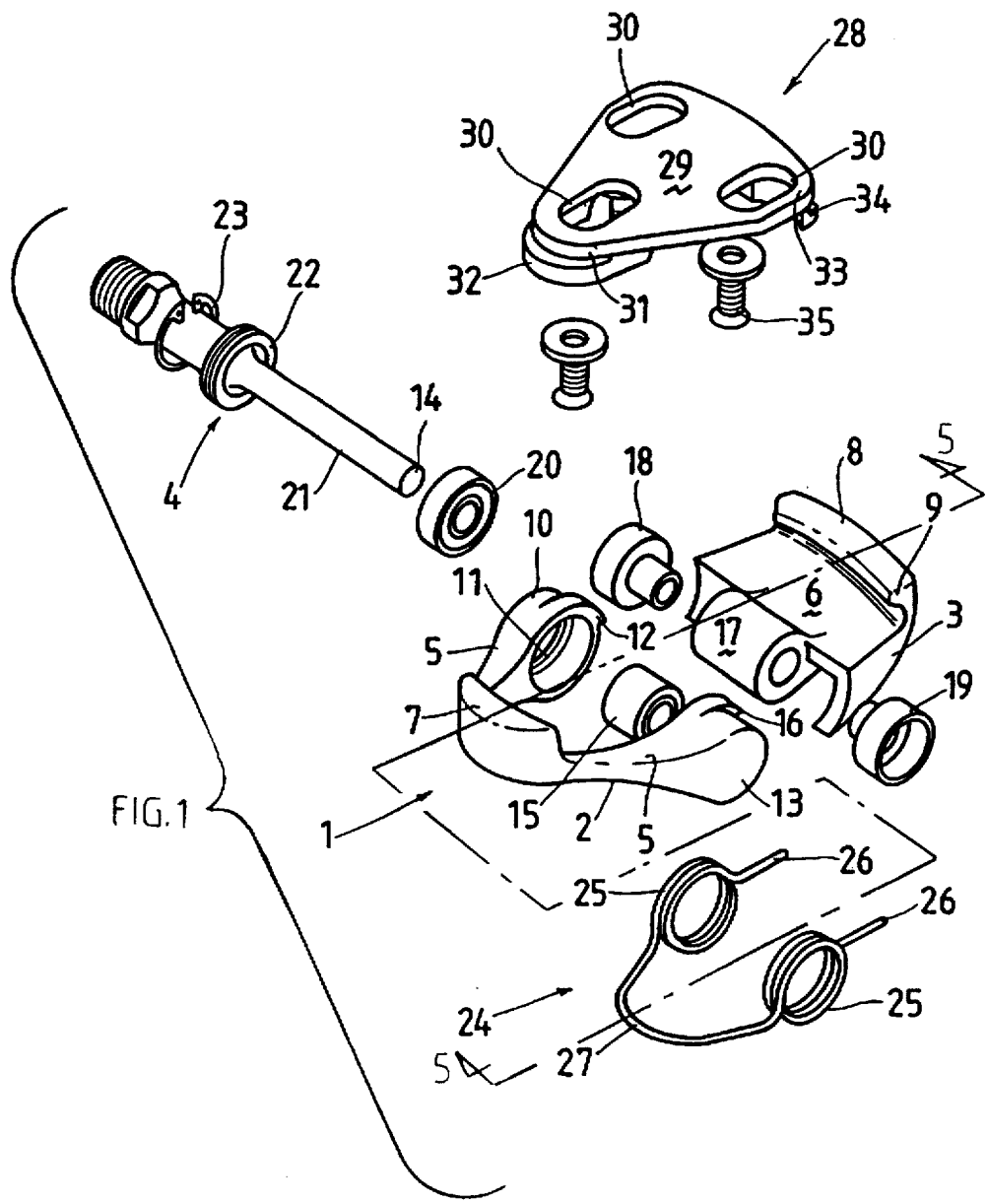
FIG. 1 is an exploded view of a bicycle pedal.

Referring to FIG. 1 an exploded view of a bicycle pedal 1 is shown.

The pedal 1 has a first support member 2 and a second support member 3 to form a foot support. The first and second support members 2 and 3 are pivotally connected to each other by means of a spindle 4. The spindle 4 is connected to a pedal crank (not shown) in conventional manner.

Each of the support members 2 and 3 has a support surface 5 and 6 and a locking means in the form of a lip 7 and 8 at each of the free ends of the support members. The lip 7 has an undercut recess (not shown) and the lip 8 has a flange 9.

The support member 2 is substantially U-shaped with a bearing housing 10 at one of its free ends. The end 11 of the bearing housing 10 is screw threaded. A lip 12 is also provided on the bearing housing 10.

The other free end 13 of the support member 2 forms a bearing housing for receiving a free end 14 of the spindle 4 as well as a bearing 15. There is also provided a lip 16 at the free end 13. The support member 3 has a housing 17 at its end opposite the lip 8.

A spacer member 18 fits between the bearing housing 10 and housing 17. A similar spacer member 19 fits between the free end 13 and into the housing 17. The spacer members 18 and 19 will preferably be made of a friction affording material.

A bearing 20 fits from the inside into the bearing housing 10.

The spindle 4 has a shaft 21 ending in the free end 14. The spindle further has a screw threaded shoulder 22 which engages with the screw threaded end 11 of the bearing housing 5. Optionally a circlip 23 may be provided which engages a groove (not shown) in the bearing housing 10.

A spring 24 has coil members 25 with a free spring end 26 projecting from each coil member 25. An integral spring end 27 connects the coil members 25 to each other.

The pedal 1 is assembled with the shaft 21 of the spindle 4 passing through the bearing housing 10, coil members 25 and bearing housing of the free end 13. The coil members 25 fit over the spacer members 18 and 19.

In the assembled configuration the spring end 27 bears against a lower surface 27A of the support member 2. The spring ends 26 bear against a lower surface 26A of the support member 3 to bias the support surfaces 5 and 6 to pivot towards each other.

The lips 12 and 16 bear against edges of the support surface 6 to prevent the support surfaces 5 and 6 from approaching each other at an obtuse angle and maintain a coplanar relationship.

Figure 2:
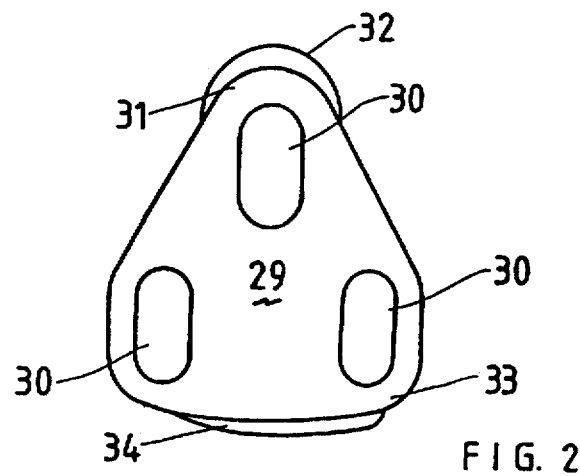
FIG. 2 is a top view of a cleat.

There is also provided a cleat 28. The cleat has a base 29 with three slots 30 formed therein. At a front end 31 of the cleat is provided an undercut locking formation 32. At a rear end 33 of the cleat is provided an undercut locking formation 34. The undercut formation 34 is wedge shaped as shown more clearly in FIG. 2.

Bolts 35 are provided to secure the cleat to the underside of a cyclist's shoe 36.

Figure 3:
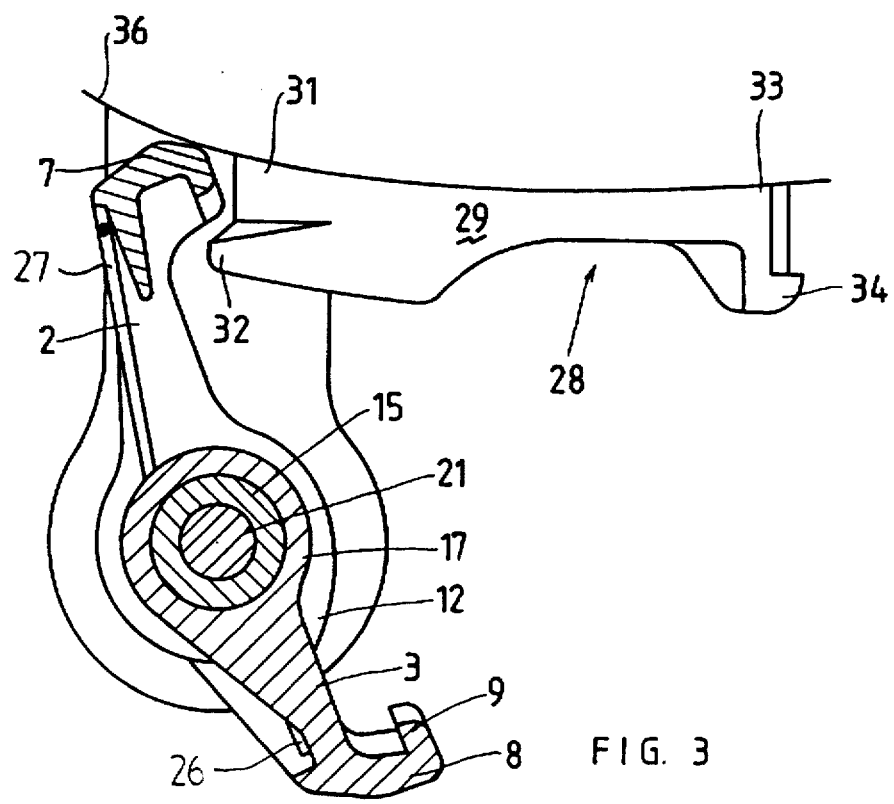
FIG. 3 is a part cross-sectional side view similar to FIG. 5 but showing different positions of a cleat and bicycle pedal with the cleat in a position where it is disengaged from the bicycle pedal.
Figure 4:
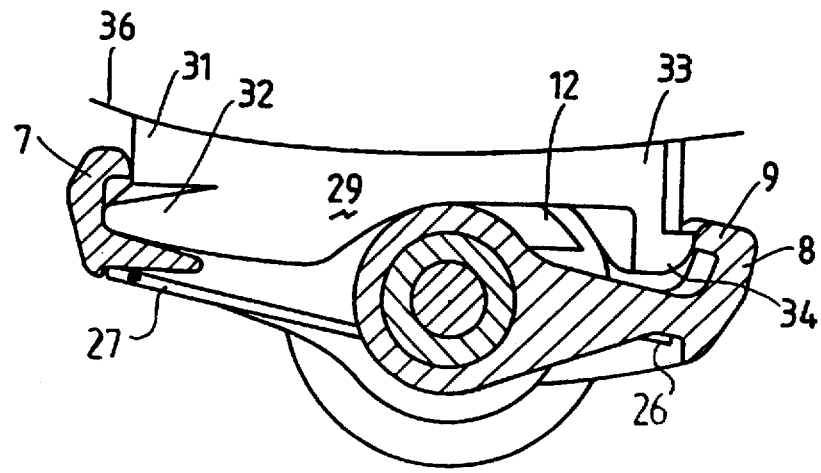
FIG. 4 is a part cross-sectional side view similar to FIG. 5 but showing different positions of a cleat and bicycle pedal with the cleat almost engaged to the bicycle pedal.
Figure 5:
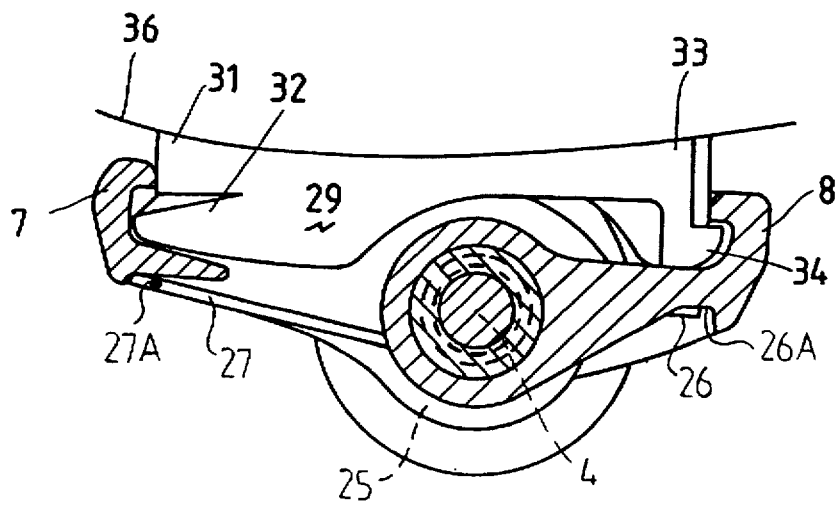
FIG. 5 is a part cross-sectional side view taken on the line 5—5 of FIG. 1 of a cleat and bicycle pedal with the cleat engaged to the bicycle pedal.
Figure 5A:
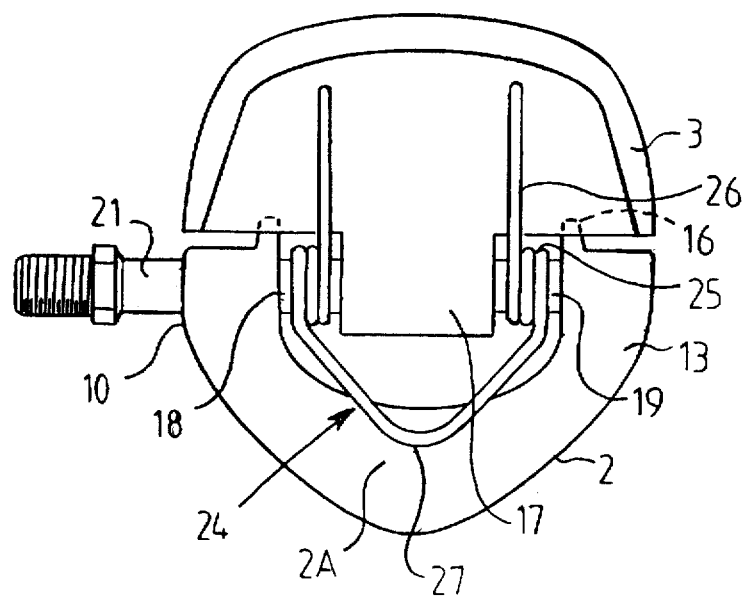
FIG. 5A is an assembly view showing the bottom side of the pedal.
Figure 5B:
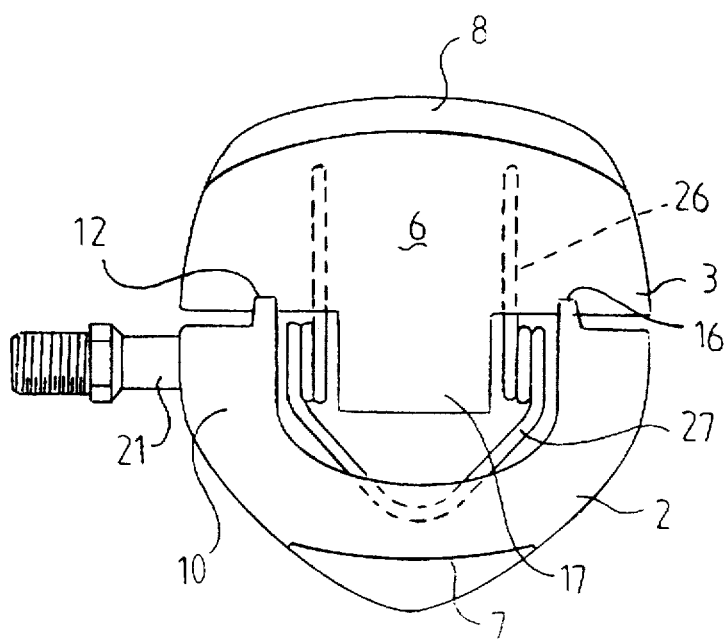
FIG. 5B is an assembly view showing the top side of the pedal.

Referring now to FIGS. 3, 4, and 5 the operation of the pedal is illustrated.

The support member 3 is heavier than the support member 2 which results in the pedal having a resting position as shown in FIG. 3. In this position the locking formation 32 is engaged to the lip 7 on the support member 2. The cleat is then moved forward and downward to a position shown in FIG. 4. In FIG. 4 the locking formation 34 bears against the flange 9 to rotate the support member 3 and move the lip 8 out of the path of locking formations 34 against the bias of spring 24. This in turn results in the locking formation 34 becoming engaged underneath the flange 9 when the support member moves back to its normal position under the influence of spring 24. This position is shown in FIG. 5.

It will be appreciated that pulling of the cleat upwardly away from the support surfaces 5 and 6 will tend to result in the lips 7 and 8 being pulled towards each other to prevent release of the cleat from the pedal.

The cleat 28 can be released from the pedal by twisting the rear end 33 of the cleat outwardly away from the pedal. This results in the wedge shaped locking formation 34 being disengaged from the lip 8. It should also be noted that the cleat can be twisted to a certain extent around an axis extending from the support surfaces 5 and 6 without being disengaged from the pedal. This rotational movement is very important during a normal cycling action.

Alternatively the flange 9 may be wedge shaped and the locking formation 34 made as a flange of constant width. This will also enable the cleat 28 to be disengaged from the pedal when the rear end 33 of the cleat is twisted outwardly.

Figure 7:
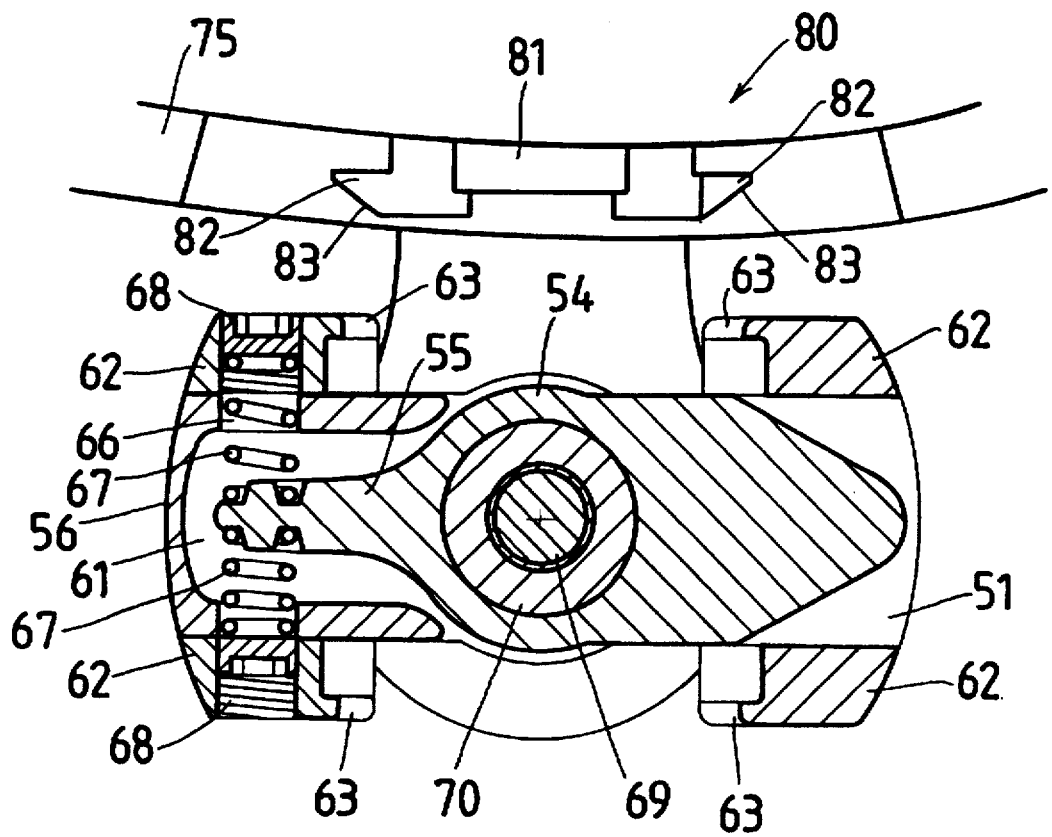
FIG. 7 is a mid-planar cross-sectional side view of a cleat and bicycle pedal shown in FIG. 6 with the cleat and pedal disengaged from each other.
Figure 8:
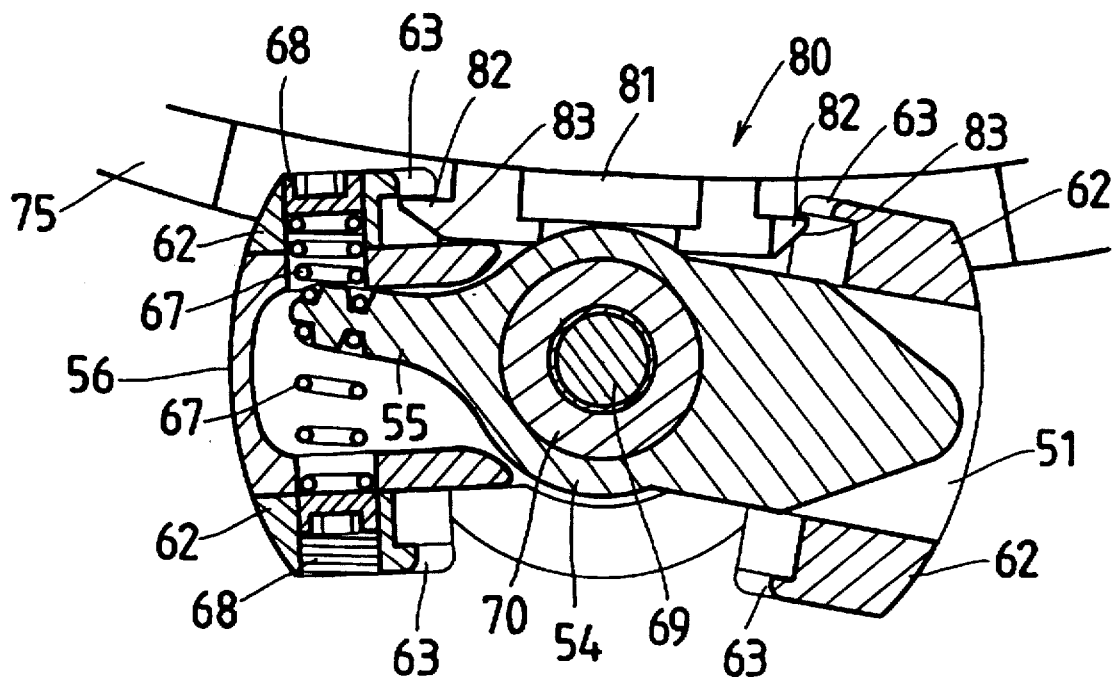
FIG. 8 is a mid-planar cross-sectional side view of a cleat and bicycle pedal shown in FIG. 6 with the cleat and pedal almost engaged to each other.

Referring now to FIGS. 6, 7 and 8 an alternative embodiment of a bicycle pedal 50 is shown.

The pedal has a first support member 51. The first support member 51 has a first support surface 52 and a second support surface 53 opposite the first support surface 52.

There is also provided a central housing 54 with an arm 55 extending from the central housing 54 away from the first support member 51.

There is further provided a second support member 56. The second support member has a first support surface 57 and a second support surface 58 opposite the first support surface 57.

The second support member 56 has two offset housings 59 and 60. A central recess 61 is provided between the offset housings 59 and 60. The offset housing 59 is internally screw threaded as shown.

On each of the support surfaces is provided a cleat engagement means which can comprise member 62. Each of the cleat engaging members 62 has a lip 63 and two short extensions 64. The cleat engaging members 62 are securable on the support surfaces by means of bolts 65.

As shown in FIG. 7 the arm 55 extends into the recess 61. A bore 66 is provided through the second support member and two springs 67 are located in the bore to abut the free end of the arm 55. Grub screws 68 fit into the cleat engagement members 62 to retain the springs 67 in position. It will be noted that the cleat engagement members 62 on the first support member 51 do not have bores as stop members for receiving a grub screw.

The springs 67 bias the respective first support surface and second support surface of the first and second support members 51 and 56 in a co-planar position as shown in FIG. 7.

A spindle 69 is provided which is rotatable in a boss 70 in conventional manner. A nut 71 secures the boss 70 on the spindle 69 and ball bearings 72 and 73 are provided between the boss 70 and the spindle 69.

The boss 70 is screw threaded at 74 to enable the boss and spindle combination to be secured to the second support member 56.

There is further provided a cleat 80. The cleat 80 has a base 81 and locking formations 82 at each end. The cleat is securable to the lower surface of a cyclist's shoe 75.

Figure 9:
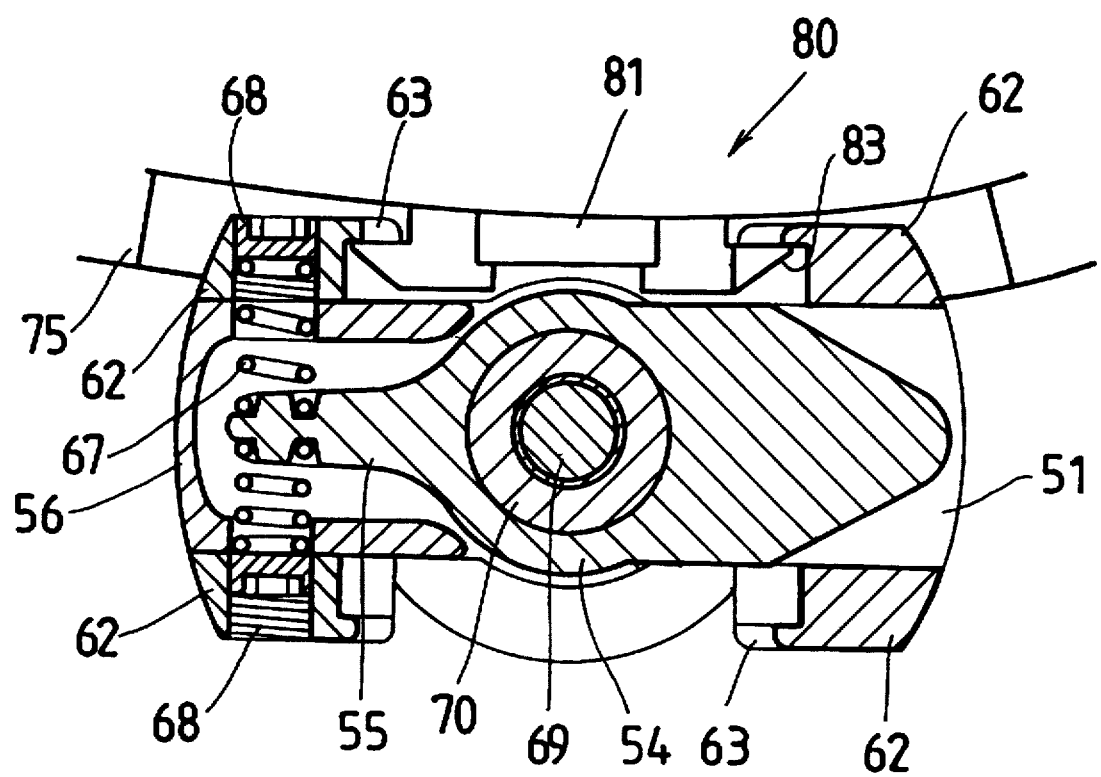
FIG. 9 is a mid-planar cross-sectional side view of a cleat and bicycle pedal shown in FIG. 6 with the cleat and pedal engaged to each other.

The cleat 80 is engaged to the pedal by moving the locking formations 82 towards the lips 63 as shown in FIGS. 7 and 8. Tapered outer surfaces 83 to the ends of cleat 80 cause the lips 63 to rotate away from each other and enable the formations 82 to move under the lips 63 against the bias of springs 67. This results in the first and second support members 51 and 56 being moved to a position shown in FIG. 8 by the bias of springs 67. Once the locking formations 82 are fully engaged under the lips 63 the first and second support members are returned to the neutral normal position as shown in FIG. 9.

It will be appreciated that pulling of the cleat away from the pedal will result in the respective lips 63 tending to be forced towards each other to prevent disengagement of the cleat from the pedal.

The cleat allows for limited twisting around an axis extending from the plane of co-operating first and second support surfaces. Once the cleat is rotated beyond a predetermined point it disengages from the pedal.

It will be appreciated that numerous variations can be made to the embodiments above described. The embodiment described with reference to FIGS. 1 to 5 may have various different bearing arrangements and the biasing of the support members may be affected in any convenient manner.

Similarly the bearing arrangement in the embodiment described with reference to FIGS. 6 to 9 may also be varied. The particular design of the cleat and associated locking formations and co-operating locking formations on the support members may also be varied as well as the type of springs used.

What we claim as new and desire to secure by letters patent is:

1. A bicycle pedal comprising a foot support and a spindle, the foot support having first and second support members each rotatably mounted on the spindle and pivotable towards each other about the spindle, each support member having a support surface on opposite faces thereof, cleat engaging means on each support surface spaced from the spindle and means for biasing the support members to releasably engage a cleat.

2. The bicycle pedal as claimed in claim 1 wherein said biasing means are springs and in which one support member carries an arm projecting into a recess in the other support member and located between said springs positioned between the arm and the other support member.

* * * * *

UNITED STATES PATENT AND TRADEMARK OFFICE
CERTIFICATE OF CORRECTION

PATENT NO. : 5,765,450
DATED : June 16, 1998
INVENTOR(S) : Kruger et al.

It is certified that error appears in the above-identified patent and that said Letters Patent is hereby corrected as shown below:

Col. 4, line 58: After "...which can comprise", insert - -a cleat engagement - - .

Signed and Sealed this

Thirteenth Day of June, 2000

Attest:

Q. TODD DICKINSON

Attesting Officer

Director of Patents and Trademarks